United States Patent
Bilange et al.

[19]

[11] Patent Number: 6,064,923
[45] Date of Patent: May 16, 2000

[54] AIRCRAFT WITH REDUCED WING STRUCTURE LOADING

[75] Inventors: Thierry Bilange, Tournefeuille; Marie-Laure Divoux-Plantaz, Plaisance du Touch, both of France

[73] Assignee: Aerospatiale Societe Nationale Industrielle, Paris, France

[21] Appl. No.: 09/301,171

[22] Filed: Apr. 28, 1999

[30] Foreign Application Priority Data

Apr. 29, 1998 [FR] France ................................... 98 05400

[51] Int. Cl.[7] .................................................. B64C 13/16
[52] U.S. Cl. ........................ 701/3; 701/120; 244/117 R; 244/75 R; 244/7 A; 244/7 C; 244/8; 244/11; 244/28; 244/72; 702/144; 73/1.78; 258/1.2; 89/37.19; 172/700; 364/130
[58] Field of Search ..................... 701/3, 120; 244/75 R, 244/117 R, 7 A, 7 C, 8, 11, 28, 72; 73/1.78; 258/1.2; 702/144; 89/37.19; 172/722; 364/130

[56] References Cited

U.S. PATENT DOCUMENTS

| | | | |
|---|---|---|---|
| 4,697,768 | 10/1987 | Klein | 244/191 |
| 5,056,027 | 10/1991 | Kahler | 701/3 |
| 5,079,711 | 1/1992 | Lambregts et al. | 701/3 |
| 5,186,416 | 2/1993 | Fabre et al. | 244/75 R |
| 5,722,615 | 3/1998 | Bilange et al. | 244/45 A |

FOREIGN PATENT DOCUMENTS 0 193 442   3/1986   European Pat. Off. ......... G05D 1/08

*Primary Examiner*—Tan Nguyen
*Assistant Examiner*—Olga Hernandez
*Attorney, Agent, or Firm*—Marshall, O'Toole, Gerstein, Murray & Borun

[57] ABSTRACT

An aircraft having a reduced-load wing structure is provided with a controllable canard stabilizer (5G, 5D) at the front end of the aircraft and a controller that controls the canard stabilizer. The controller generates a turn command corresponding to an increase in the lift of the canard stabilizer when, simultaneously, the turn command applied by the pilot to the elevational control surfaces (6G, 6D) exceeds a threshold and the measurement of the vertical acceleration of the aircraft exceeds a threshold.

11 Claims, 3 Drawing Sheets

FIG.1
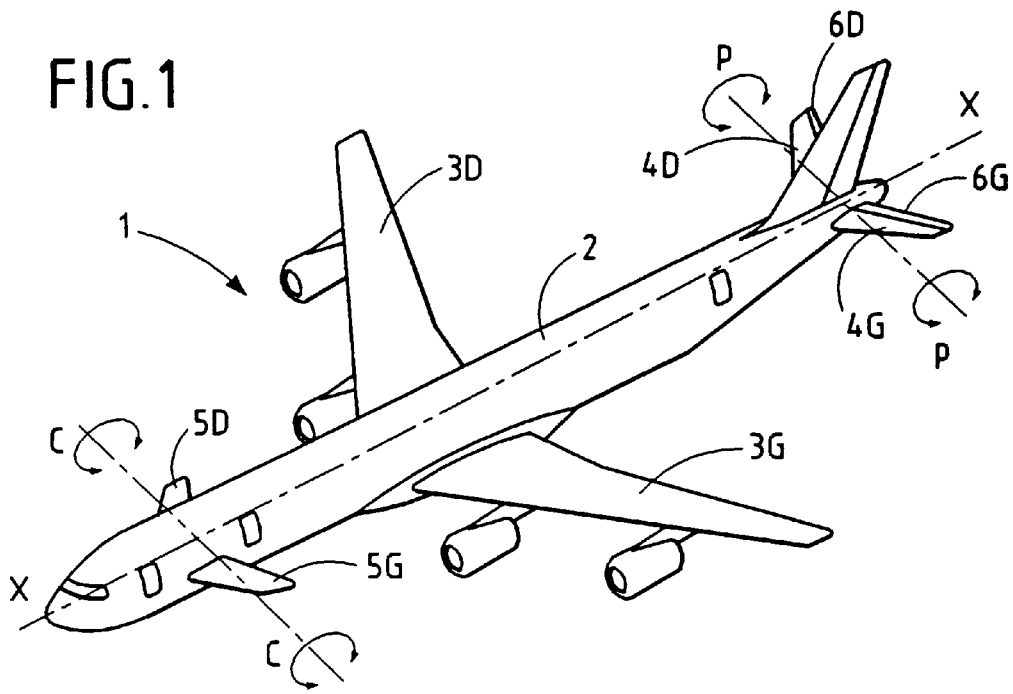
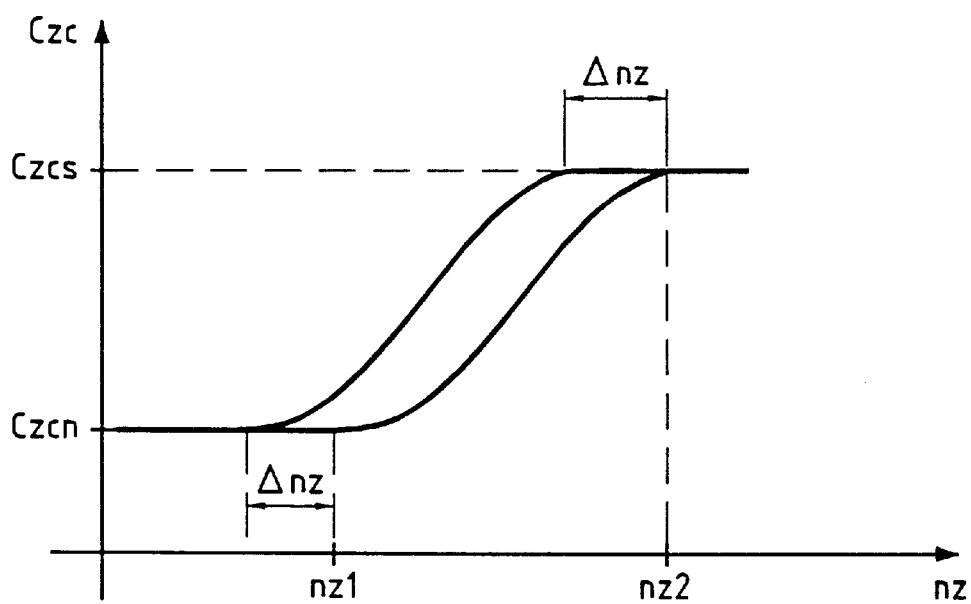
FIG.3

AIRCRAFT WITH REDUCED WING STRUCTURE LOADING

The present invention relates to an aircraft in which the loadings applied during flight to its wing structure, especially at the wing roots, are reduced. It applies to aircraft which have a front stabilizer, generally known as a canard stabilizer, which is partially or completely controllable by a flight control computer, as described, for example, in documents EP-A-0 193 442, FR-A-2 449 592 or FR-A2719 548.

There is already known from U.S. Pat. No. 5,186,416 a system for reducing the loadings applied to the wing structure of an aircraft and those applied to the root of this wing structure. In this known system, use is made of aerodynamic surfaces connected to said wing structure to bring the point of application of overall lift of the wing structure closer to the fuselage and thus decrease the bending moment that the aircraft structure has to withstand at the wing root when the aircraft is subjected to a vertical acceleration above a predetermined threshold. This system is applicable both when the aircraft experiences a gust of wind and when it is executing a maneuver, such as pulling up, in response to a deliberate action from the pilot.

The way in which this known system works relies on the turning of aerodynamic surfaces connected to the wing structure, and results in a limitation that is due to the number of said aerodynamic surfaces available for doing this. Furthermore, the maximum excursion of each of said wing structure aerodynamic surfaces used is generally limited for reasons of vibrations (buffeting) or loss of efficiency beyond a certain threshold.

The object of the invention is to overcome these drawbacks by making best use of all the lift-creating aerodynamic surfaces of an aircraft equipped with a front stabilizer to obtain the desired maneuverability (load factor).

To this end, according to the invention, the aircraft comprising:

a main wing structure, elevation control aerodynamic surfaces controlled by a deliberate-actuation member (stick, ministick) which is available to the pilot and which generators a turn command dm for said elevation-control aerodynamic surfaces, and a front (canard) stabilizer, the planes of which are partially or completely adjustable, in coupled fashion, in terms of angular orientation under the action of actuators controlled by calculation means, is noteworthy in that said calculation means:

continuously receive:
said turn command dm generated by said deliberate-actuation member,
a measurement of the angle of incidence $\alpha c$ of said front stabilizer,
a measurement of the Mach number M of said aircraft,
a measurement of the flight altitude Zp of said aircraft, and
a measurement of the vertical acceleration nz (load factor) of said aircraft;

hold in memory:
a "nose-up" threshold dms for said turn command dm generated by said deliberate-actuation member,
the aerodynamic characteristics of said front stabilizer, and
a first vertical-acceleration threshold nz1 for the measurement of the vertical acceleration nz of said aircraft;

calculate, for said front stabilizer, a turn command dic corresponding to an increase in the lift of this stabilizer when, simultaneously, said turn command dm generated by said actuating member exceeds said nose-up threshold dms and the measurement of the vertical acceleration nz of said aircraft exceeds said first vertical-acceleration threshold nz1; and apply said turn command dic thus calculated to said front stabilizer via said actuators.

Thus, when the aircraft pilot maneuvers the aircraft by acting on said deliberate-actuation member to bring about a pitching moment to bring the nose of the aircraft up (that is to say when the pilot pulls on the stick), which increases the angle of incidence, the total lift and the vertical acceleration of the aircraft, the lift of the front stabilizer of the aircraft is itself increased and provides some of the increase in total lift. The increase in the lift of the front stabilizer therefore plays a part in limiting the increase in lift of the wing structure and consequently in the loadings applied thereto, especially at its root on the aircraft.

It will be observed that the reduction in loadings applied to said wing structure occurs, in accordance with the present invention, during a deliberate maneuver on the part of the pilot (the elevation-control turn command exceeds said first threshold) and when the vertical acceleration of the aircraft is beyond a certain value (above said threshold nz1). Thus, protection of the wing structure in accordance with the present invention actually only comes into effect when the loadings applied to the wing structure, and particularly to its root, are likely to reach a critical value that endangers the structural integrity of the wing structure or fuselage when the aircraft is executing a maneuver in flight. This protection in accordance with the present invention therefore comes into operation only to reduce the maximum loadings and is not active in normal flight, so as to avoid excessive use of the actuators associated with the front stabilizer and an increase in the drag of the aircraft.

Thus, in an aircraft which has a front stabilizer, the present invention makes it possible to make best use of all the lift-creating surfaces to obtain the desired load factor and therefore the desired maneuverability.

Unlike the prior art technique recalled above, which shifts the point of application of the aerodynamic faces of the wing structure, the present invention reduces the overall lift of the wing structure by transferring the difference in lift onto the front stabilizer.

It will, however, be observed, that the present invention is compatible with this prior art technique and that it could be possible to employ both techniques simultaneously on one and the same aircraft which has a front stabilizer, one technique (the prior art technique) employing aerodynamic surfaces connected to the wing structure and the other technique (the present invention) acting on said front stabilizer.

Said turn command applied to the front stabilizer by said calculation means generates a pitching moment which can immediately be countered by applying an appropriate command to said elevation-control aerodynamic surfaces or to all the other surfaces capable of developing a pitching moment when the aircraft is in normal use. If the aircraft has a stabilizing lift-creating rear surface (horizontal stabilizer), this rear surface may alone be sufficient to stabilize the airplane by countering the pitching moment generated by said front stabilizer by increasing its own lift. Such a stabilizing action therefore also plays a part in reducing the lift of the wing structure and therefore the loads applied to the wing structure and the moment applied to the wing root.

In one advantageous embodiment of the present invention, said calculation means hold in memory a second vertical-acceleration threshold nz2 for the measurement of the vertical acceleration nz, said second threshold nz2 being higher than said first threshold nz1, and said turn command dic for said front stabilizer corresponds, on the one hand, to an at least approximately linear variation in the lift of said front stabilizer as a function of said vertical acceleration nz when this acceleration lies between said first and second vertical-acceleration thresholds nz1 and nz2 and, on the other hand, to a maximum lift ceiling value Czcs independent of said vertical acceleration nz when the latter is higher than said second threshold nz2.

Thus, said calculation means may therefore:

determine, on the basis of said aerodynamic characteristics, the coefficient of lift Czαc and the zero-lift angle of incidence αoc of said front stabilizer for the measured Mach number M and measured altitude Zp;

calculate, on the basis of said coefficient of lift and of the zero-lift angle of incidence thus determined, and on the basis of said measurement of the angle of incidence αc of said front stabilizer, the coefficient of lift Czc thereof;

determine said maximum lift ceiling value Czcs for said measured Mach number M and measured altitude Zp; and calculate said turn command dic using the formula:

dic=(Czcs−Czc)/Czαcx(nz−nz1)/(nz2−nz1).

As a preference, said first and second vertical-acceleration thresholds are respectively of the order of 2 g and 2.5 g (g being the acceleration due to gravity).

It is advantageous for said calculation means to hold in memory a vertical-acceleration hysteresis value Δnz for delaying the decrease in lift of said front stabilizer as a function of the decrease in said vertical acceleration nz between said first and second thresholds nz2 and nz1. This hysteresis value Δnz may be of the order of 0.15 g.

In cases where said aircraft comprises a main device for controlling said front stabilizer using said actuators to which said main device sends a turn command dicn, it is advantageous to provide a first intermediate device, of the adder or switching type, the output of which controls said actuators and the two inputs of which respectively receive the turn command dic calculated by said calculation means and the turn command dicn generated by said main control device.

Thus, the lift of said front stabilizer is controlled, when the conditions for lightening the load on the wing structure are simultaneously fulfilled, either by the sum of the commands dic and dicn, or by said command dic.

The aircraft may additionally comprise a second intermediate device, also of the adder or switching type, the output of which controls said elevation-control aerodynamic surfaces, and the two inputs of which respectively receive a turn command dq generated by said calculation means to counter the pitching moment generated by said front stabilizer, and the turn command originating from said deliberate-actuation member.

The present invention applies equally well whether the front stabilizer be completely or partially adjustable. For this purpose, the planes of said front stabilizer can rotate about an axis that is transverse to the longitudinal axis of the aircraft and/or may be equipped with trailing edge control surfaces.

The figures of the appended drawing will make it easy to understand how the invention may be embodied. In these figures, identical references denote similar elements.

FIG. 1 is a perspective view of a transport airplane with a canard front stabilizer in accordance with the invention.

FIG. 3 is a diagram illustrating, as a function of the vertical acceleration, the variation in lift of the canard front stabilizer of said transport airplane.

The transport airplane 1 in accordance with the present invention and depicted in FIG. 1 comprises a fuselage 2, of longitudinal axis X—X, to which there are connected, among other things, two wings 3G and 3D forming the main wing structure, a horizontal rear stabilizer formed of two stabilizing planes 4G and 4D and a canard front stabilizer equipped with two canard planes 5G and 5D. The two wings 3G and 3D, the two rear stabilizer planes 4G and 4D and the two front canard planes 5G and 5D are, respectively, symmetric with respect to one another about the longitudinal axis X—X.

The wings 3G and 3D bear flaps, ailerons, slats, etc. (not depicted), and propulsion engines (depicted, but not referenced).

Each of the rear stabilization planes 4G and 4D is equipped with an elevation-control surface 6G or 6D, respectively, and may possibly be adjusted in terms of angular orientation by rotation about a transverse axis P—P, perpendicular to the longitudinal axis X—X, said rear stabilizing planes 4G and 4D being coupled in terms of rotation.

Each of the front canard planes 5G and 5D can be adjusted in terms of angular orientation by rotation about a transverse axis C—C, perpendicular to the longitudinal axis X—X.

Figure 2:
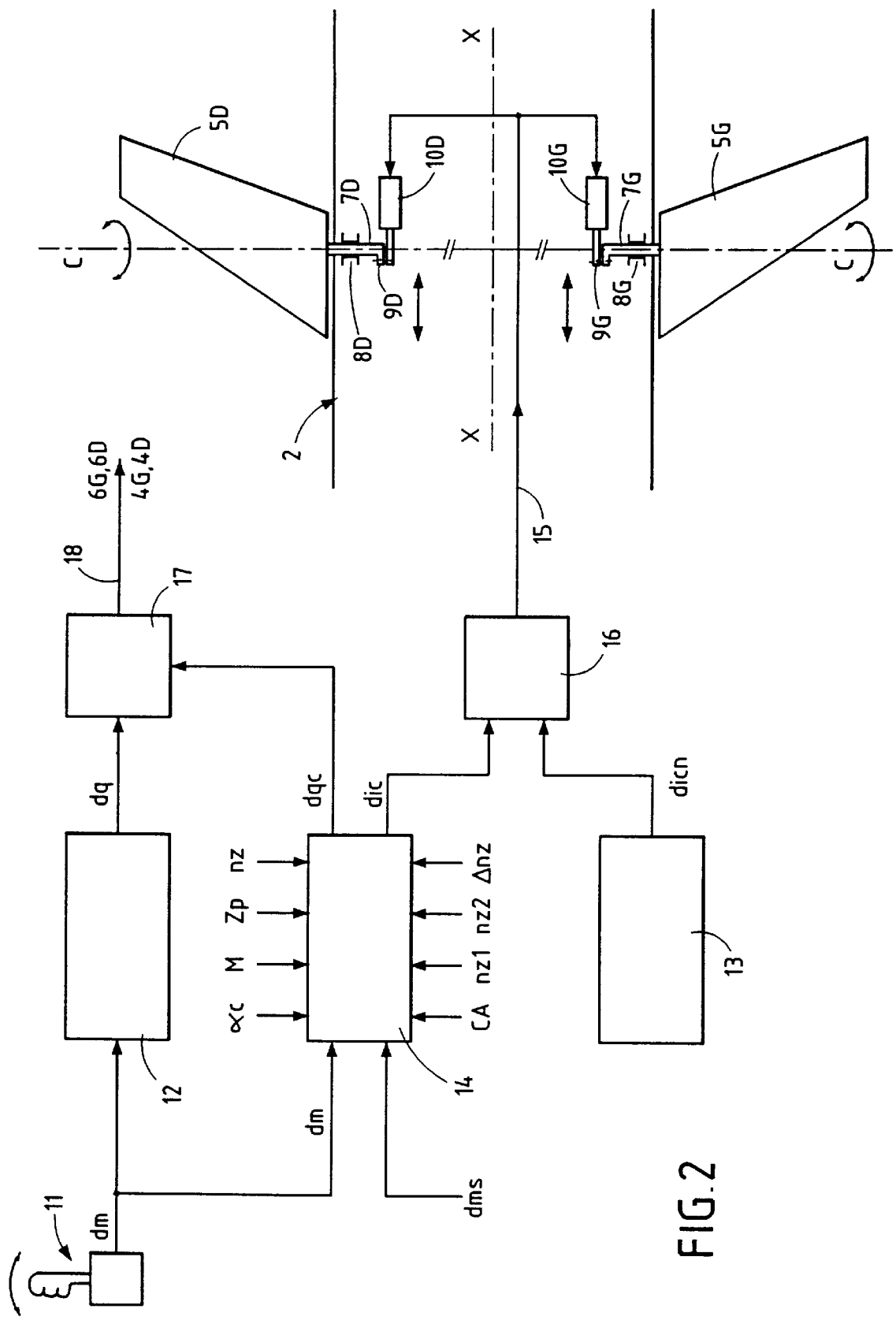
FIG. 2 is the block diagram of one embodiment of the system for protecting the wing structure of said transport airplane against excessive loadings.

For this purpose, as can be seen in FIG. 2, each canard plane 5G, 5D is secured to a shaft 7G, 7D pivoting freely in bearings 8G, 8D secured to the airplane 1.

In the example of FIG. 2, each shaft 7G, 7D has a wrist pin 9G, 9D, said wrist pins being articulated on actuating members 10G, 10D, for example jacks, respectively.

Furthermore, the transport airplane 1 comprises, in the usual way, a deliberate-actuation member 11, of the stick or ministick type, available to the pilot and capable of generating an elevation-control command dm. This elevation-control command is transmitted to an elevation-control device 12 which sends an elevation-control signal dq to the elevation-control surfaces 6G and 6D and/or to other aerodynamic surfaces of the airplane 1 (which are not depicted) capable of controlling the elevation of the airplane.

The airplane 1 also comprises a device 13, for example the one described in FR-A-2 719 548, which generates a nominal turn command dicn for the front canard planes 5G and 5D, and is applied to said jacks 10G and 10D.

In accordance with the present invention, there is also provided a computer 14, calculating a safety turn command dic for said front canard planes 5G and 5D, this safety turn command being intended to be added to the nominal turn command dicn. For this purpose, in the link 15 between the jacks 10G and 10D, on the one hand, and the device 13 and the computer 14, on the other hand, there is inserted an adder 16. Incidentally, the computer 14 may calculate a turn command dqc for the elevation-control surfaces 6G and 6D, which command is intended to counter the pitching moment generated by the front canard planes 5G and 5D. This turn command dqc is sent to an adder 17 inserted in the link 18 between the elevation-control device 12 and said elevation-control surfaces 6G and 6D. The computer 14 may also generate a command intended to vary the angular orientation of the stabilizing planes 4G and 4D when these are adjustable about the axis P—P.

The computer 14 continuously receives:

the turn command dm generated by the deliberate elevation-control actuating member 11;

a measurement of the angle of incidence ac of the front stabilizer 5G, 5D, this measurement being delivered for example by an angle of incidence probe (not depicted);

a measurement of the Mach number M, this measurement being delivered by a machmeter (not depicted);

a measurement of the altitude Zp, this measurement being delivered in a known fashion by an altimeter or by altimetric probes (not depicted);

a measurement of the vertical acceleration nz, this measurement being delivered in a known manner by an accelerometer or by a gyrometer (neither depicted).

Furthermore, the computer 14 holds in memory:

a nose-up threshold dms for the turn command dm, said threshold dms corresponding, for example, to one half of the travel of the deliberate-actuation member 11 in the nose-up direction;

the aerodynamic characteristics CA of the front stabilizer 5G, 5D, comprising at least the coefficient of lift Czαc and the zero-lift angle of incidence αoc. These aerodynamic characteristics are, for example, in the form of tables which give their value as a function of the Mach number M and of the altitude Zp;

a threshold nz1 for the vertical acceleration nz of the airplane 1, this threshold nz1 being, for example, equal to 2 g (g being the acceleration due to gravity);

another threshold nz2 for the vertical acceleration nz of the airplane 1, this threshold nz2 being higher than the threshold nz1 and for example equal to 2.5 g; and a vertical acceleration hysteresis value Δnz, for example equal to 0.15 g.

The computer 14 operates as follows:

it determines, on the basis of the tables containing the aerodynamic characteristics CA of the front stabilizer 5G, 5D, the values of the coefficient of lift Czαc and of the zero-lift angle of incidence aoc thereof, corresponding to the measured values of the Mach number M and of the altitude Zp;

it calculates, on the basis of the measurement of the angle of incidence ac of the front stabilizer 5G, 5D and of the values of the coefficient of lift Czαc and of the zero-lift angle of incidence αoc determined above, the coefficient of lift Czc of said front stabilizer;

it determines, on the basis of the tables containing the aerodynamic characteristics CA of the front stabilizer 5G, 5D, the maximum possible lift thereof as a function of the flight scenario, the Mach number M and the altitude Zp. It subtracts from this maximum lift a safety margin, defined to avoid atmospheric disturbances encountered during the maneuver and liable to bring the front stabilizer into stall or buffeting conditions, so as to obtain a maximum authorized lift Czcs for said front stabilizer. For example, the maximum authorized lift Czcs is chosen to be equal to 90% of said maximum possible lift;

it calculates, when the measured vertical acceleration nz becomes higher than the threshold nz1, a turn command dic for said front stabilizer, such that $$dic=(Czcs-Czc)/Cz\alpha c \times (nz-nz1)/(nz2-nz1);$$

and, if the turn command dm originating from the deliberate-actuation member is above the nose-up threshold dms, it applies this turn command dic to the front stabilizer 5G, 5D.

Thus, when the vertical acceleration nz of the airplane 1 exceeds the threshold nz1 and this acceleration is desired by the pilot (because dm is higher than dms), the system of FIG. 2 turns the front stabilizer 5G, 5D to make its lift increase, up to the maximum authorized value Czcs reached for the nz2 value of vertical acceleration nz.

This is illustrated by the diagram of FIG. 3, which shows that:

when the vertical acceleration nz is below the threshold nz1, the lift of the front stabilizer 5G, 5D is at a level Czcn determined by the device 13;

when the vertical acceleration nz exceeds the threshold nz1, the lift of the front stabilizer 5G, 5D increases until it reaches the value Czcs at the threshold nz2;

if the vertical acceleration nz becomes higher than nz2, the lift of the front stabilizer 5G, 5D remains stable at the level of the maximum permissible value Czcs;

if the vertical acceleration nz decreases, the decrease in lift of the front stabilizer 5G, 5D is delayed by the hysteresis value Δnz so that this decrease does not begin until the vertical-acceleration value equals nz2−Δnz and ends when the vertical-acceleration value is equal to nz1−Δnz.

The hysteresis due to the delay Δnz introduced by the computer 14 is intended to prevent a disruption in the stability of the airplane 1 during maneuvers with an unstabilized load factor. What happens is that the variation in lift of the canard has an immediate effect on the stability of the airplane, and the desire is to avoid any delay in elevation-attitude stabilization.

It will be noted that the horizontal rear stabilizer 4G, 4D exerts a passive elevation-control stabilizing effect when the lift of the front stabilizer 5G, 5D varies. If this passive stabilizing effect is not enough, the computer may, via the adder 17 and the link 18, send an elevation-control stabilization command dqc to the elevation-control surfaces 6G, 6D and possibly to the horizontal rear stabilizer 4G, 4D if it is of the adjustable orientation type.

In the above description, it was assumed that the devices 16 and 17 were adders, summing, respectively, the commands dicn and dic and the commands dqc and dq. It will be readily understood that the devices 16 and 17 could be switches respectively sending the front stabilizer 5G, 5D either the dic command or the dicn command, and the elevation-control surfaces 6G, 6D (and possibly the rear stabilizer 4G, 4D) either the dq command or the dqc command.

Figure 4:
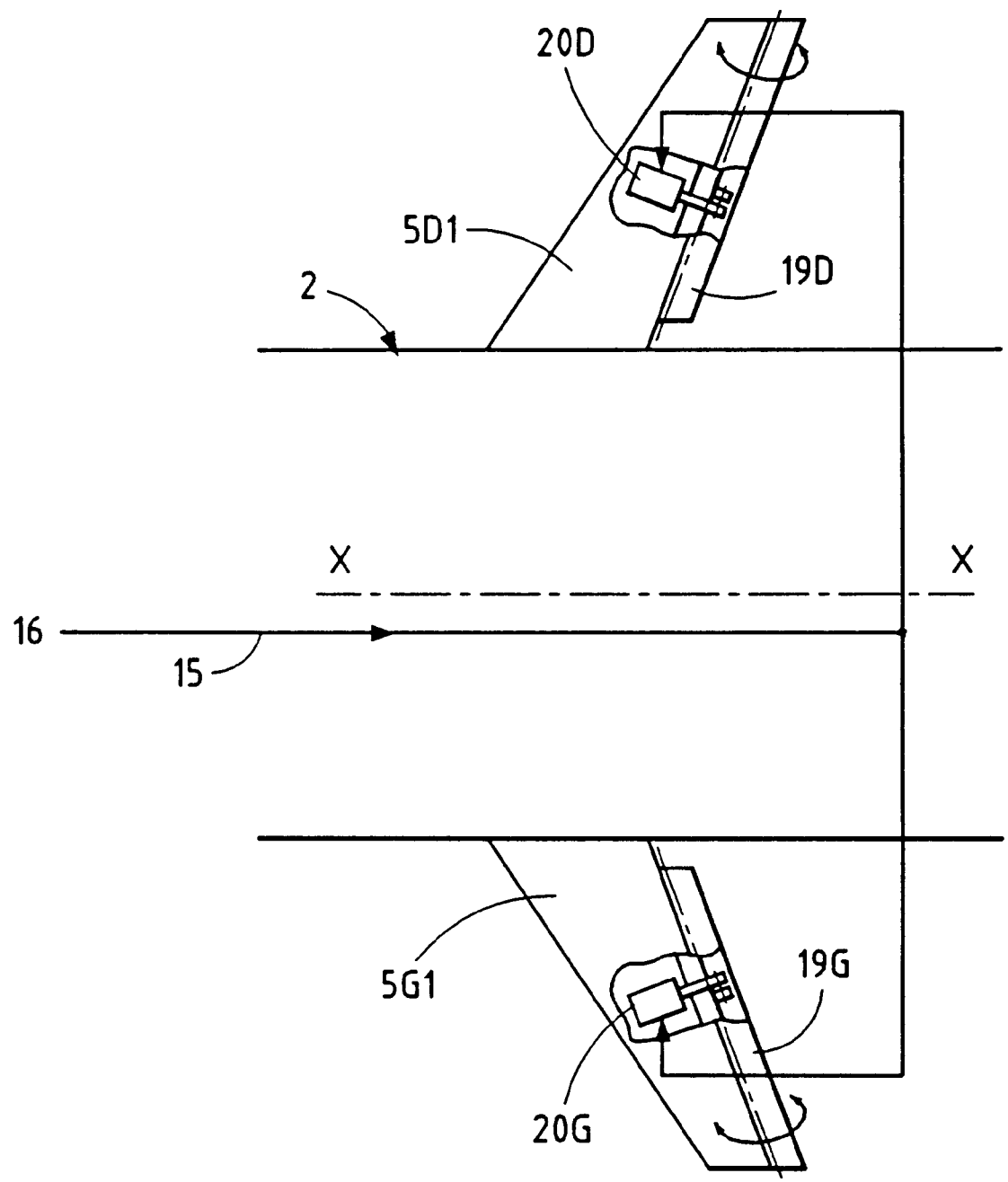
FIG. 4 illustrates an alternative form of the canard front stabilizer.

Furthermore, in FIGS. 1 and 2, it was shown that the planes 5G and 5D of the front stabilizer were orientable, as a whole, about the transverse axis C—C. FIG. 4 depicts an alternative embodiment in which the planes 5G1 and 5D1 of the front stabilizer are fixed, but respectively fitted with trailing edge control surfaces 19G and 19D actuated by jacks 20G and 20D receiving the dic and/or dicn commands.

Of course, although this other alternative form is not depicted, the orientable planes 5G and 5D of the front stabilizer of FIG. 2 may also be fitted with trailing edge control surfaces similar to the control surfaces 19G and 19D.

What we claim is:

1. An aircraft comprising:

a main wing structure (3G, 3D), elevation control aerodynamic surfaces (6G, 6D) controlled by a deliberate-actuation member (11) which is available to the pilot and which generators a turn command dm for said elevation-control aerodynamic surfaces (6G, 6D), and a front stabilizer (5G, 5D), the planes of which are partially or completely adjustable, in coupled fashion, in terms of angular orientation under the action of actuators (10G, 10D) controlled by calculation means (14), wherein said calculation means (14):

continuously receive:

said turn command dm generated by said deliberate-actuation member (11), a measurement of the angle of incidence $\alpha c$ of said front stabilizer (5G, 5D), a measurement of the Mach number M of said aircraft, a measurement of the flight altitude Zp of said aircraft, and a measurement of the vertical acceleration nz of said aircraft;

hold in memory:

a "nose-up" threshold dms for said turn command dm generated by said deliberate-actuation member (11), the aerodynamic characteristics (CA) of said front stabilizer (5G, 5D), and a first threshold nz1 for the measurement of the vertical acceleration nz of said aircraft;

calculate, for said front stabilizer (5G, 5D), a turn command dic corresponding to an increase in the lift of this stabilizer when, simultaneously, said turn command dm generated by said actuating member exceeds said nose-up threshold dms and the measurement of the vertical acceleration nz of said aircraft exceeds said first threshold nz1; and apply said turn command dic thus calculated to said front stabilizer (5G, 5D) via said actuators (10G, 10D).

2. An aircraft as claimed in claim 1, wherein said first vertical-acceleration threshold nz1 is of the order of 2 g.

3. An aircraft as claimed in claim 1, in which there is a main device (13) for controlling said front stabilizer (5G, 5D) using said actuators (10G, 10D–19G, 19D) to which it sends a turn command dicn, which comprises a first intermediate device (16), the output of which controls said actuators and the two inputs of which respectively receive the turn command dic calculated by said calculation means (14) and the turn command dicn generated by said main control device (13).

4. An aircraft as claimed in claim 1, which comprises a second intermediate device (17), the output of which controls said elevation-control aerodynamic surfaces (6G, 6D), and the two inputs of which respectively receive a turn command dqc generated by said calculation means (14) to counter the pitching moment generated by said front stabilizer (5G, 5D), and the turn command dq originating from said deliberate-actuation member (11).

5. An aircraft as claimed in claim 1, wherein the planes (5G, 5D) of said front stabilizer rotate about an axis (C—C) that is transverse to the longitudinal axis (X—X) of the aircraft.

6. An aircraft as claimed in claim 1, wherein the planes (5G, 5D) of said front stabilizer are equipped with trailing-edge control surfaces.

7. An aircraft as claimed in claim 1, wherein said calculation means (14) hold in memory a second threshold nz2 for the measurement of the vertical acceleration nz, said second threshold nz2 being higher than said first vertical-acceleration threshold nz1, and wherein said turn command dic for said front stabilizer (5G, 5D) corresponds, on the one hand, to an at least approximately linear variation in the lift of said front stabilizer (5G, 5D) as a function of said vertical acceleration nz when this acceleration lies between said first and second vertical-acceleration thresholds nz1 and nz2 and, on the other hand, to a maximum lift ceiling value Czcs independent of said vertical acceleration nz when the latter is higher than said second vertical-acceleration threshold nz2.

8. An aircraft as claimed in claim 7, wherein said calculation means (14):

determine, on the basis of said aerodynamic characteristics (CA), the coefficient of lift $Cz\alpha c$ and the zero-lift angle of incidence $\alpha oc$ of said front stabilizer (5G, 5D) for the measured Mach number M and measured altitude Zp;

calculate, on the basis of said coefficient of lift and of the zero-lift angle of incidence thus determined, and on the basis of said measurement of the angle of incidence $\alpha c$ of said front stabilizer (5G, 5D), the coefficient of lift Czc thereof;

determine said maximum lift ceiling value Czcs for said measured Mach number M and measured altitude Zp; and calculate said turn command dic using the formula:

$$dic=(Czcs-Czc)/Cz\alpha c \times (nz-nz1)/(nz2-nz1).$$

9. An aircraft as claimed in claim 7, wherein said second vertical-acceleration threshold nz2 is of the order of 2.5 g.

10. An aircraft as claimed in claim 7, wherein said calculation means (14) hold in memory a vertical-acceleration hysteresis value $\Delta nz$ for delaying the decrease in lift of said front stabilizer (5G, 5D) as a function of the decrease in said vertical acceleration nz between said second and first vertical-acceleration thresholds nz2 and nz1.

11. An aircraft as claimed in claim 10, wherein said hysteresis value $\Delta nz$ is of the order of 0.15 g.

* * * * *